(12) United States Patent
Jiao et al.

(10) Patent No.: US 10,907,976 B2
(45) Date of Patent: Feb. 2, 2021

(54) DETECTING DEFECTS IN MAP DATA

(71) Applicant: Uber Technologies, Inc., San Francisco, CA (US)

(72) Inventors: Jialin Jiao, San Francisco, CA (US); Berk Gurakan, Mountain View, CA (US); Vikram Saxena, Cupertino, CA (US); Haider Ali Razvi, Santa Clara, CA (US)

(73) Assignee: Uber Technologies, Inc., San Francisco, CA (US)

( * ) Notice: Subject to any disclaimer, the term of this patent is extended or adjusted under 35 U.S.C. 154(b) by 170 days.

(21) Appl. No.: 16/184,749

(22) Filed: Nov. 8, 2018

(65) Prior Publication Data
US 2019/0390965 A1    Dec. 26, 2019

Related U.S. Application Data

(60) Provisional application No. 62/690,097, filed on Jun. 26, 2018.

(51) Int. Cl.
*G01C 21/32* (2006.01)
*G01C 21/34* (2006.01)
*G01S 19/42* (2010.01)

(52) U.S. Cl.
CPC .............. *G01C 21/32* (2013.01); *G01C 21/34* (2013.01); *G01S 19/42* (2013.01)

(58) Field of Classification Search
CPC .......... G01C 21/32; G01C 21/34; G01S 19/42
See application file for complete search history.

(56) References Cited

U.S. PATENT DOCUMENTS

| | | | |
|---|---|---|---|
| 2014/0236434 A1* | 8/2014 | Sujan ....................... | F02D 29/02 701/51 |
| 2015/0168161 A1* | 6/2015 | Raychev ................ | G01C 21/32 701/430 |
| 2016/0209221 A1* | 7/2016 | Pfeifle ..................... | G06F 16/29 |

* cited by examiner

*Primary Examiner* — Thomas Ingram
(74) *Attorney, Agent, or Firm* — Fenwick & West LLP

(57) ABSTRACT

A network system evaluates candidate GPS routes with respect to map routes that are based on ground truth map data to identify defects in the ground truth map data. Defects in the ground truth map data may include inconsistencies between various attributes of the map data and the actual road network represented by the candidate GPS routes under evaluation. The network system corrects the identified feedback to ensure that the ground truth map data accurately reflects the attributes of the actual road network.

20 Claims, 12 Drawing Sheets

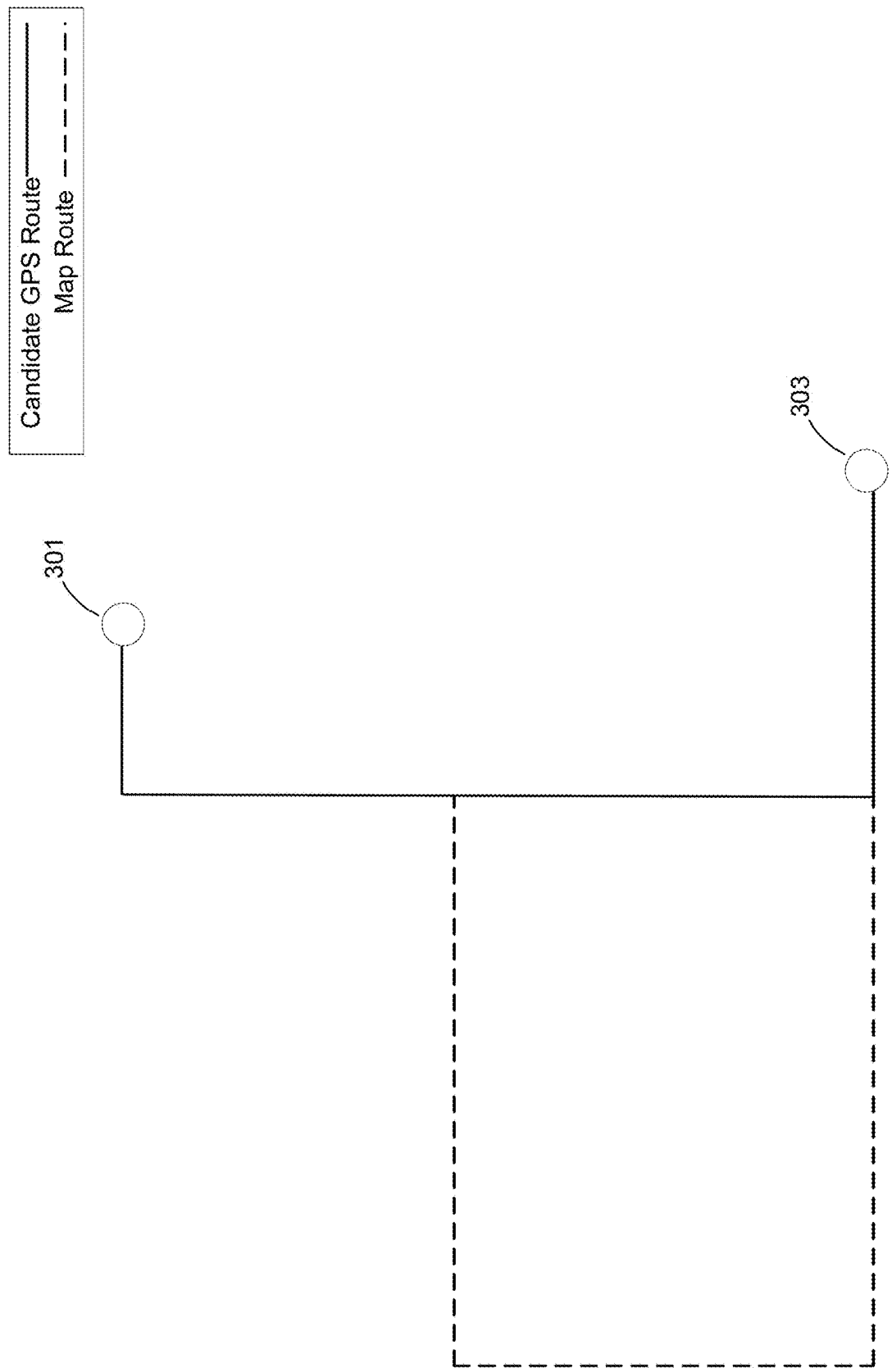

DETECTING DEFECTS IN MAP DATA

CROSS-REFERENCE TO RELATED APPLICATIONS

This application claims the benefit of U.S. Provisional Patent Application No. 62/690,097 filed Jun. 26, 2018, which is incorporated by reference in its entirety.

TECHNICAL FIELD

The embodiments disclosed herein generally relate to automatically detecting defects in ground truth map data for a road network and updating the ground truth map data based on the detected defects.

BACKGROUND

Typical navigation systems provide route guidance from a starting location to a destination location for autonomous vehicles or for human operators of vehicles. Navigation systems utilize routing algorithms to identify an efficient route (e.g., based on time and/or distance) from the starting location to the destination location.

The road network in the real world is represented as a map data model in navigation systems. The accuracy of the map data impacts the ability of navigation systems to identify efficient routes. However, if there are defects in the map data that are inconsistent with the real-world road network, current navigation systems may be unable to identify the most efficient route from a starting location to a destination location.

SUMMARY

Digital maps in a network system can be used to facilitate service coordination between two parties operating client devices within a system environment. For example, a network system may be used to coordinate a transportation service between a service provider and a service requester. Maps can be used for determining routing information, relative positioning, travel time estimations, fare calculations, etc.

Generally, the maps used by the network system include a road network representing an area in which the transportation service is being coordinated. The maps are considered the ground truth map data for the network system. However, the digital map may have been created inaccurately, and in addition, over time the road network in the physical environment may change and the digital maps are no longer an accurate representation of the physical environment. In one embodiment, GPS trace data that is representative of a path taken along a road network may be used to determine defects in ground truth map data associated with the digital maps. The network system may correct the determined defects so as to provide the most efficient routes possible.

The features and advantages described in this summary and the following detailed description are not all inclusive. Many additional features and advantages will be apparent to one of ordinary skill in the art in view of the drawings, specification and claims.

BRIEF DESCRIPTION OF THE DRAWINGS

FIG. 3A illustrates a GPS route and a map route from a starting location to a destination location according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
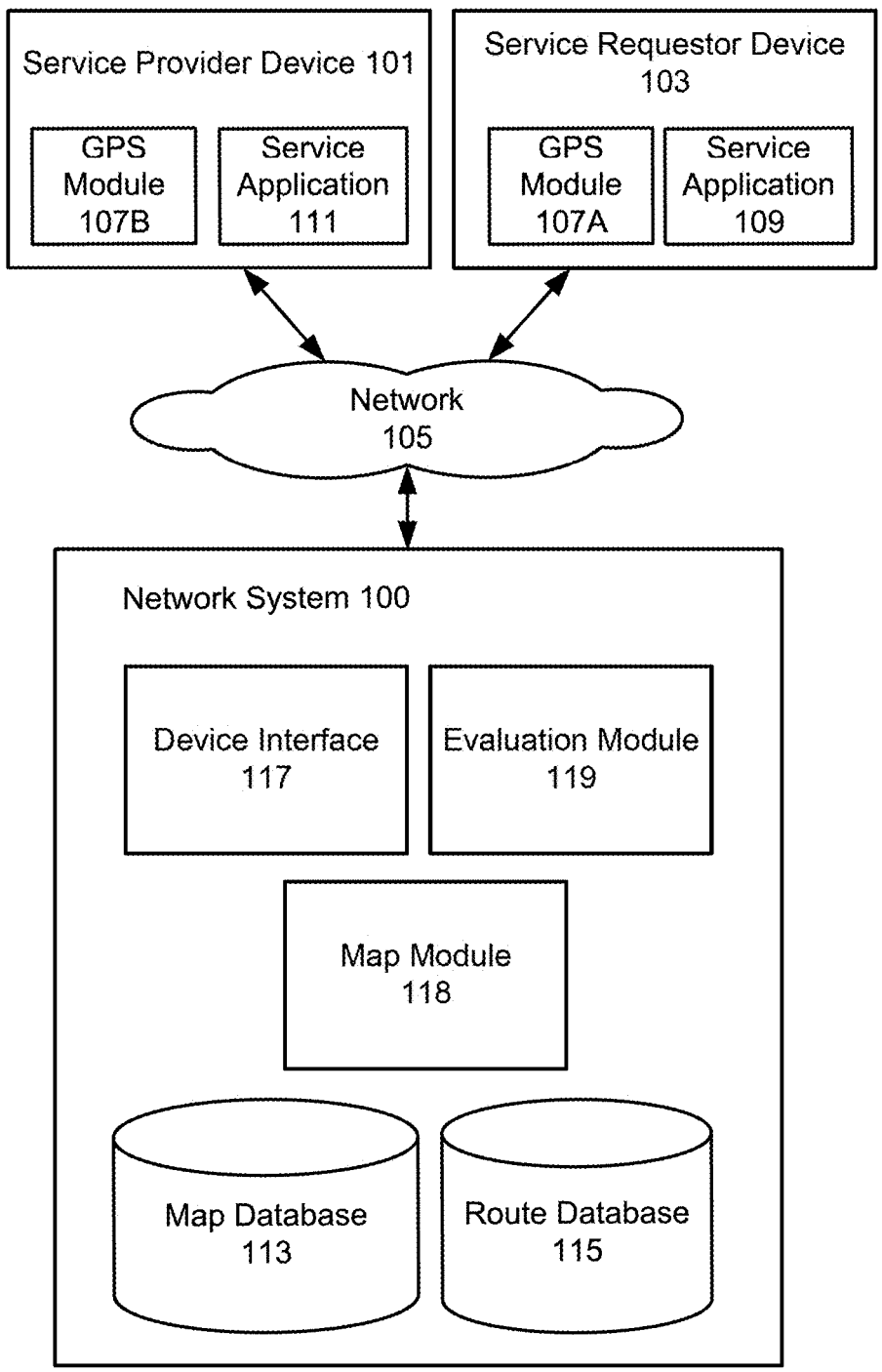
FIG. 1 illustrates a system environment in accordance with one embodiment.

FIG. 1 illustrates a system environment that includes a network system 100, a service provider device 101, and a service requester device 103 in accordance with one embodiment. In particular, FIG. 1 illustrates a detailed view of modules within the network system 100, the service provider device 101, and the service requester device 103 according to one embodiment. Some embodiments of the network system 100, the service provider device 101, and the service requester device 103 have different modules than those described here. Similarly, the functions can be distributed among the modules in a different manner than is described here. As used herein, the term "module" refers to computer program logic used to provide the specified functionality. Thus, a module can be implemented in hardware, firmware, and/or software.

In one embodiment, the network system 100 implements a network service, such as an arrangement service, which enables services to be arranged between parties such as between the users of the service provider device 101 and the service requester device 103. As described herein, a service provider device 101 can correspond to a mobile computing device, such as a smartphone, that is operated by a service provider, such as a driver of a vehicle, or can correspond to an on-board computing system of a vehicle. The network system 100 can also correspond to a set of servers, in some examples, and can operate with or as part of another system that implements network services. An example of the services includes arranging a transport service or a delivery service between a service requester and a service provider. In the context of the discussion herein, an operator of a transportation vehicle (e.g., the service provider) provides the service of transporting a person (e.g., the requester) to a destination requested by the person. In one embodiment, transportation vehicles include personal vehicles such as cars and motorcycles as well as public transportation vehicles such as trains, light rail, buses, etc.

In one embodiment, the transportation of a person from a starting location to a destination location is referred to as a trip. Generally, the network system 100 calculates fares for trips. A fare is a monetary payment from a service requester to a service provider in exchange for the service provider transporting the service requester to a destination location.

In one embodiment, the network system 100 also updates ground truth map data based on the paths of travel taken by transportation vehicles to complete trips. The network server 100 receives GPS data from a service provider device 101 included in a transportation vehicle. The GPS data may be received as the transportation vehicle moves its position or after the trip is completed. The GPS data received from the service provider device 101 is representative of the route taken by the service provider during a trip. The network system 100 may evaluate GPS data that is representative of trips completed by service providers to detect defects in the map data. The map data may be updated by the network system 100 to correct the detected defects thereby maintaining an accurate representation of the actual road network in the physical world. By updating the map data, the network system 100 also ensures that efficient routes are provided to the service provider device 101 to complete service requests.

As shown in FIG. 1, the network system 100 is in communication with the service provider device 101 and the service requester device 103 via a network 105. In one embodiment, the network 105 is the Internet or any combination of a LAN, a MAN, a WAN, a mobile, wired or wireless network, a private network, or a virtual private network. While only a single service provider device 101 and a single service requester device 103 are shown in FIG. 1, any number of service provider devices 101 and service requester devices 103 can be in communication with the network system 100.

In one embodiment, the service requester device 103 is an electronic device (e.g., a smart phone) of a person that requested a trip. The service requester device 103 is used by the person to request a trip from a starting location to a destination location via a service application 109 included in the service requester device 103. The service application 109 allows the user of the service requester device 103 to submit a trip request, which the tracking server 100 then processes in order to select an operator of a transportation vehicle.

According to examples, the trip request may include (i) a user identifier (ID), (ii) a pickup location (e.g., a location identifier of the current position of the service requester device 103 as determined by a GPS module 107A included in the service requester device 103), (iii) a destination location, and/or (iv) a vehicle type. For example, the GPS module 107A uses sensors (e.g., a GPS receiver) included in the service requester device 103 to determine the position of the service requester device 103 at various instances in time. In one embodiment, the current position of the service requester device 103 is represented by a location identifier such as latitude and longitude coordinates. The current position of the service requester device 103 may also be associated with a time stamp indicating the time and/or date in which the GPS module 107A measured the current position of the service requester device 103. Alternatively, the pickup location of the service requester device 103 may be manually inputted into the service requester device 103 by the user of the device 103, such as by selecting a location on a map or in the form of an address including at least a street number and street name.

The arrangement service, which is implemented by the network system 100 and/or other servers or systems, can receive the trip request over the network 105 and can select an operator or service provider for the requester. In one example, the arrangement service can (i) identify a pool of service providers that are available to provide the requested service and satisfy one or more conditions (e.g., have the specified vehicle type, and/or are within a predetermined distance or estimated travel time away from the pickup location), (ii) select a service provider from the pool of service providers, and (iii) transmit an invitation to the service provider device 101 of the service provider. The invitation can include the pickup location, so that the selected service provider can navigate to the pickup location for initiating the trip for the requester. If the selected service provider accepts the invitation by providing input on the service provider device 101, the network system 100 can notify the service requester device 103 accordingly.

In one embodiment, the service provider device 101 is an electronic device (e.g., a smart phone) located within the transportation vehicle used to complete trips. The service provider device 101 includes a service application 111. The service application 111 displays, on the service provider device 101, information about a trip that the service provider has agreed to provide, such as the pickup location, and/or navigation and/or mapping information instructing the service provider to travel to the pickup location. As referred to herein, the pickup location may be the current location of the service requester device 103 or a location specified by the user of the service requester device 103. The service application 111 may also display, on the service provider device 101, the destination for the assigned trip if provided by the user of the service requester application 111.

The service provider device 101 includes a GPS module 107B. The GPS module 107B uses one or more sensors of the service provider device 101 to identify GPS data of the transportation vehicle as the transportation vehicle moves along one or more roads to complete a trip. The GPS data of the transportation vehicle is representative of the transportation vehicle's position at different instances in time during a trip. For example, at time t=T1, the service provider device 101 can be at a particular GPS location, identified by a location identifier (e.g., latitude and longitude coordinates) and a time stamp indicative of the time and/or date when the service provider device 101 measured its current position. If the transportation vehicle is moving, at time t=T2 the service provider device 101 can be at a different GPS location. In this manner, the service provider device 101 periodically measures the current position of the transportation vehicle (e.g., every three seconds, every four seconds, etc.) and provides GPS data that is representative of the position of the transportation vehicle over time to the network system 100. Alternatively, the service provider device 101 may provide GPS data whenever new or updated measurements of the current position of the transportation vehicle are taken or are available.

Each of the service applications 111 and 109 respectively stored at the service provider device 101 and the service requester device 103 can include or use an application programming interface (API) to communicate data with the network system 100. The API can provide access to the network system 100 via secure access channels over the network 105 through any number of methods, such as web based forms, programmatic access via restful APIs, Simple Object Access Protocol (SOAP), remote procedure call (RPC), scripting access, etc., while also providing secure access methods including key-based access to ensure the network system 100 remains secure and only authorized users, service providers, and/or third parties can gain access to the tracking server 100.

As shown in FIG. 1, the network system 100 comprises a map database 113 that stores map data. The map data stored in the map database 113 is considered ground truth data that is representative of the road network in the physical world. The map database 113 stores a variety of map spatial databases. Map spatial databases are queryable databases identifying map data such as different points (e.g., having a latitude and longitude, and/or an altitude) along paths of trips that a given transportation vehicle can use, and information about how the different points connect with other points. Some commercially available map spatial databases include points identifying locations of interests or landmarks.

With respect to vehicles, a vehicle map database can include points corresponding to locations on road segments such as roadways, highways, freeways, etc. The vehicle map database may also include other information related to roadways, such as intersections, one way streets, how the different roads and streets connect to each other, etc. Thus, the map data for a vehicle map database describes a road network. The vehicle map data may also include attributes of each road segment as will be further described below. Additional map databases can be created or modified in the map database 113 as a result of real life updates and changes.

The device interface 117 manages communication between the network system 100, the service provider device 101, and the service requester device 103 over the network 105. The device interface 117 receives trip requests from the service requester device 103 and transmits invitations to the service provider device 101. In addition, the device interface 117 receives trip acceptances from the service provider device 101 and routes notifications of the trip acceptances to the service requester device 103. In one embodiment, the device interface 117 receives GPS data and/or state information about the service provider or service application 111 from the service provider device 101 as the transportation vehicle moves to complete a trip and forwards the GPS route data for storage in a route database 115.

The route database 115 stores GPS route data associated with trips completed by service providers. In one embodiment, each GPS route stored in the route database 115 is represented by a collection of GPS data (e.g., GPS points) received from a service application 111 of a service provider device 101.

In one embodiment, the network system 100 includes a map module 118. The map module 118 determines a route from a starting location to a destination location based on the map data in the map database 113. In one embodiment, routes determined by the map module 118 are considered "map routes" given that the routes are determined based on the ground truth map data stored in the map database 113. The map module 118 receives the starting location and a destination location for a trip and determines the best route (i.e., the most efficient route) in terms of distance and/or time from the starting location to the destination location for the trip based on the map data stored in the map database 113. For example, the map module 118 may use a routing algorithm such as the A* algorithm on the map data to identify the best route for the trip from the starting location to the destination location. In one embodiment, the determined route includes one or more connected road segments or roadways (e.g., streets, freeways, and/or highways) that the transportation vehicle may use to complete a trip. As the GPS data for the starting location and destination location is received, the map module 118 identifies different roadways that the transportation vehicle may use to complete the trip. Note that the map module 118 may use any other routing algorithm to identify the best routes for trips from starting locations and destination locations received from service requester devices 103.

In one embodiment, the network system 100 includes an evaluation module 119 that evaluates candidate GPS routes stored in the route database 115. The evaluation module 119 may evaluate candidate GPS routes stored in the route database 115 with respect to map routes determined by the map module 118 to identify defects in the map data stored in the map database 113. Defects in the map data may include inconsistencies between various attributes of the map data and the actual road network represented by the candidate GPS routes under evaluation.

As mentioned above, each road segment in the road network that is represented by map data is associated with attributes. The attributes that are associated with each road segment may be invalid due to changes of the road network over time. In one embodiment, attributes of a road segment in the map data include the road network geometry of the road segment. The road network geometry describes the physical geometry of the road segment such as the shape of the road segment and/or any intersections of the road segment with other road segments. For example, if the map data fails to include an existing shortcut road segment that connects two other road segments, the map module 118 is unable to determine the most efficient route that uses the shortcut road segment.

The attributes of a road segment in the map data also include directionality of the road segment. The directionality of a road segment describes whether the road segment allows for either one-way traffic or two-way traffic and the allowed direction of travel on the road segment. One-way traffic describes when vehicles can only drive on a road segment in a single direction (e.g., east bound) whereas two-way traffic describes when vehicles can drive on a road segment in two different directions. If the attributes of the map data for a road segment incorrectly indicates that a two-way road segment is a one-way road segment, or a one-way road segment as a two-way road segment, the map module 118 may not be able to route through a road segment while it should (e.g., a first example case) or may provide routing information that cannot be legally driven in the physical road network (e.g., a second example case).

The attributes of a road segment in the map data also include turn restrictions for intersection points between road segments. In one embodiment, a turn restriction describes whether turn(s) are allowed at the intersection of two or more road segments. For example, the map data may indicate that there is no turn restriction from one road segment to another road segment when in actuality there exists a turn restriction from the road segment to the other road segment in the physical road network. Conversely, the map data may indicate a turn restriction from one road segment to another road segment when in actuality there does not exist a turn restriction from the road segment to the other road segment in the physical road network.

The attributes of a road segment in the map data also include a speed limit(s) of the road segment. The speed limit for the road segment describes the maximum speed allowed on the road segment. In one embodiment, the speed limit for a road segment may vary depending on the time of day or day of the week. For example, the speed limit on a road near a school may be 25 mph during the weekday, but 35 mph during the weekend. In another example, the speed limit of a road may be 35 mph from 6 AM to 10 AM, but 45 mph otherwise. An inaccurate speed limit of a road segment may affect the map module 118's ability to identify the map data because the computation of costs of different possible routes considers travel time. Thus, if a road segment has an incorrect speed limit in the map data, the cost of routes containing the road segment will be inaccurate thereby affecting the map module 118's ability to find the most efficient routes that include the road segment.

The attributes of a road segment in the map data also include accessibility information. The accessibility information designates road segments as private roads, HOV (e.g., carpool) lanes, or toll roads.

Figure 2:
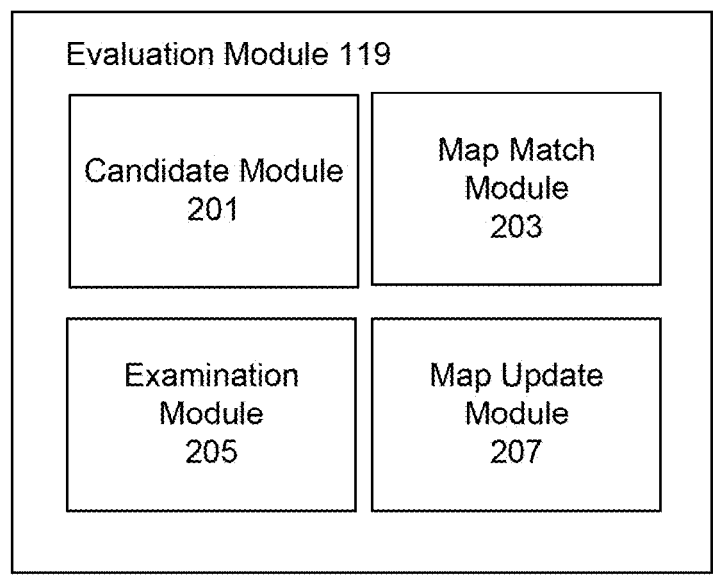
FIG. 2 illustrates a detailed view of an evaluation module included in the system environment shown in FIG. 1 according to one embodiment.

FIG. 2 illustrates a block diagram illustrating modules of the evaluation module 119 according to one embodiment. Generally, the different modules included in the evaluation module 119 collectively allow the evaluation module 119 to determine defects in the ground truth map data.

As shown in FIG. 2, the evaluation module 119 includes a candidate module 201. In one embodiment, the candidate module 201 selects candidate GPS routes from the route database 115 for evaluation. The candidate module 201 selects a candidate GPS route from a starting location to a destination location for evaluation with respect to a map route from the starting location to the destination location determined by the map module 118. In one embodiment, the candidate module 201 determines an ordering of candidate GPS routes for evaluation based on the total trip time associated with each trip. Candidate GPS routes with a total trip time that is greater than a threshold amount of time (e.g., 15 min) may have higher priority for evaluation than candidate GPS routes with a total trip time less than the threshold. In one embodiment, two candidate GPS routes (e.g. GPS route vs map route) with a difference in trip time that is greater than a threshold, are prioritized for examination.

In one embodiment, the candidate module 201 compares a candidate GPS route with a corresponding map route determined by the map module 118 to determine which route is more efficient in terms of distance and/or time. To determine the efficiency of the candidate GPS route and the map route, the candidate module 201 may determine the distance between the starting location to the destination location using the candidate GPS route and may determine the distance between the starting location to the destination location using the map route.

FIG. 3A illustrates a candidate GPS route and a map route from a starting location 301 to destination location 303. The candidate module 201 may determine the distance between the starting location 301 and the destination location 303 using the candidate GPS route and may determine the distance between the starting location 301 to the destination location 303 using the map route. The candidate module 201 may also determine the time required to travel between the starting location 301 to the destination location 303 using the candidate GPS route and may determine the time required to travel between the starting location 301 to the destination location 303 using the map route.

In one embodiment, the candidate module 201 determines whether the candidate GPS route or the map route is more efficient based on the determined distances and/or time required to travel from the starting location 301 to the destination location 303 for each route. In the example shown in FIG. 3A, the candidate module 201 determines that the candidate GPS route is more efficient than the map route due to the shorter distance and time required to travel from the starting location 301 to the destination location 303.

In one embodiment, responsive to the candidate module 201 determining that the map route is as efficient or more efficient that the candidate GPS route, the candidate module 201 takes no further action since the map data stored in the map database 113 provided the most efficient route between the starting location to the destination location. That is, the ground truth data represented by the map data in the map database 113 accurately reflects the attributes of the physical road network that is used to complete the trip from the starting location to the destination location so the map data does not require updating. However, responsive to the candidate module 201 determining that the candidate GPS route is more efficient than the map route, the candidate module 201 determines that the candidate GPS route requires further examination to determine whether the candidate GPS route is actually routable based on the map data stored in the map database 113. That is, the candidate module 201 determines that the map data stored in the map database 113 requires examination to determine whether the map data includes defects that prevented the map module 118 from determining and providing the candidate GPS route from the starting location to the destination location.

Referring back to FIG. 2, in one embodiment the evaluation module 119 includes a map match module 203. The map match module 118 matches a candidate GPS route that was determined to be more efficient than its corresponding map route to road segments in the map data stored in the map database 113. That is, the map match module 119 determines an ordered sequence of one or more road segments (e.g., streets, freeways, and/or highways) that the transportation vehicle used to complete a trip represented by the candidate GPS route.

To match the candidate GPS route to the map data, the map match module 203 queries the map database 113 for a vehicle map database. The map match module 203 uses the vehicle map database to identify one or more location points of the vehicle map database that corresponds to a given GPS point included in the candidate GPS route. A candidate point is a point having a latitude and longitude corresponding to a known location in the vehicle map database. For example, in the vehicle map database a candidate point can be a point that corresponds to a location on a street or at an intersection between multiple streets. As a result, the map match module 203 can identify a candidate point that best matches each GPS point included in the candidate GPS route.

In one embodiment, the map match module 203 selects a map matching model to determine the path of travel of the transportation vehicle among road segments in the map data based on the identified candidate points. For example, the map match module 203 may use a hidden Markov model solver, a routing engine, a physics engine, or other models, individually or in combination, to determine the path of travel of the transportation vehicle along road segments in the map data that corresponds to the candidate GPS route. The path determined by the map match module 203 includes an ordered set of road segments from the map data that are indicative of the road segments used to reach the destination location from the starting location in the physical world.

In one embodiment, the map match module 203 relaxes the constraints of the road network attributes in the map data when matching the candidate points that associated with the candidate GPS route to the map data. That is, the map match module 203 ignores road network attributes such as road network geometry, directionality of road segments, turn restrictions, speed limits of road segments, and any other road network attributes during matching. By relaxing the constraints of the road network attributes, the map match module 203 can map the identified candidate points that correspond to the candidate GPS route to the map data based on the geometric aspects of the candidate GPS route. Thus, the map match module 203 maintains the same geometric shape of the candidate GPS route when determining the path of travel for the candidate points that correspond to the candidate GPS route.

Figure 3B:
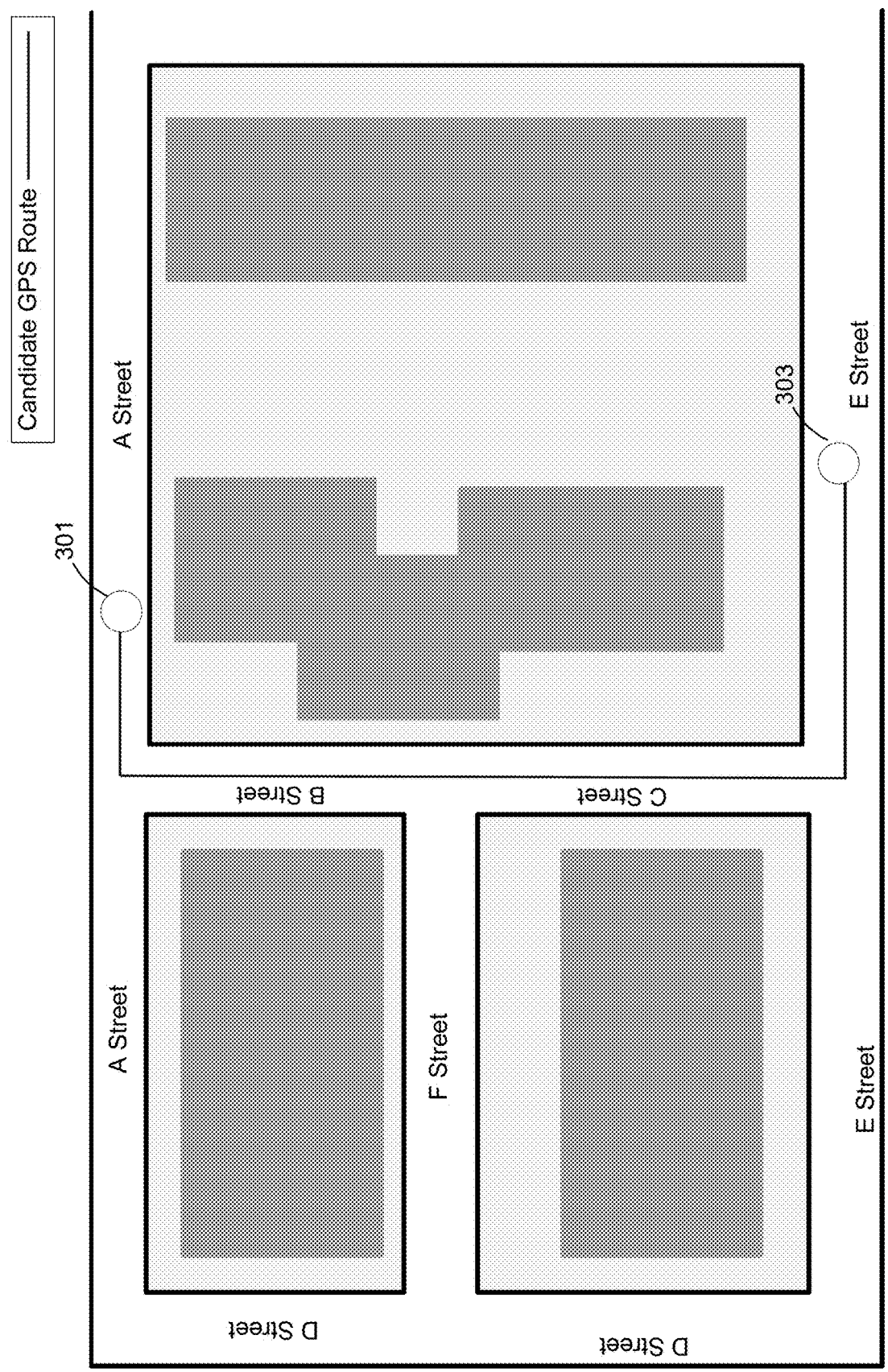
FIGS. 3B and 3C illustrates the GPS route of FIG. 3A matched to road segments of map data according to one embodiment.

FIG. 3B illustrates the candidate GPS route shown in FIG. 3A that is matched to road segments in the map data. As shown in FIG. 3B, the candidate GPS route is matched to the ordered road segments A Street, B Street, C Street, and E Street. The ordered road segments indicate that to get from the starting location 301 to the destination location 303, the driver of the transportation vehicle drove west on A street, made a left on B street and continued south on B street which turned into C street, and the finally turned left onto E street to reach the destination location 303.

Referring back to FIG. 2, in one embodiment the evaluation module 119 includes an examination module 205 that examines the ordered set of road segments that are matched to the candidate GPS route. The ordered set of road segments are examined by the examination module 205 to determine whether the candidate GPS route is routable (e.g., drivable) based on the road network attributes that are associated with the road segments in the map data. If the result of the examination indicates that the candidate GPS route is not routable based on the map data, the examination module 205 determines that there is one or more defects in the map data that prevented the map module 118 from identifying the candidate GPS route. The examination module 205 assumes that the map data includes a defect given that the driver of the transportation vehicle was able to complete the trip from the starting location to the destination location using the candidate GPS route.

In one embodiment, the examination module 205 evaluates each road segment included in the set of road segments according to the identified order of the road segments. In the example shown in FIG. 3B, the examination module 205 would first evaluate A Street, then B street, followed by C Street, and lastly E Street. The evaluation of each road segment includes a comparison of the road network attributes associated with the road segment from the map data with the road network attributes associated with the road segment from the candidate GPS route. In one embodiment, the attributes associated with road segments from GPS routes are inferred. That is, the attributes of GPS route's segments are not explicitly stored in the Route Database 115, but could be inferred from the travel direction of the GPS route. If the examination module 205 identifies an inconsistency between road network attributes associated a road segment from the map data with the road network attributes associated with the corresponding road segment from the candidate GPS route, the examination module 205 determines that the road network attribute in the map data is defective. Otherwise, if the road network attributes from the map data are consistent with the road network attributes of the candidate GPS route, the examination module 205 determines that the map data is accurate.

Figure 3C:
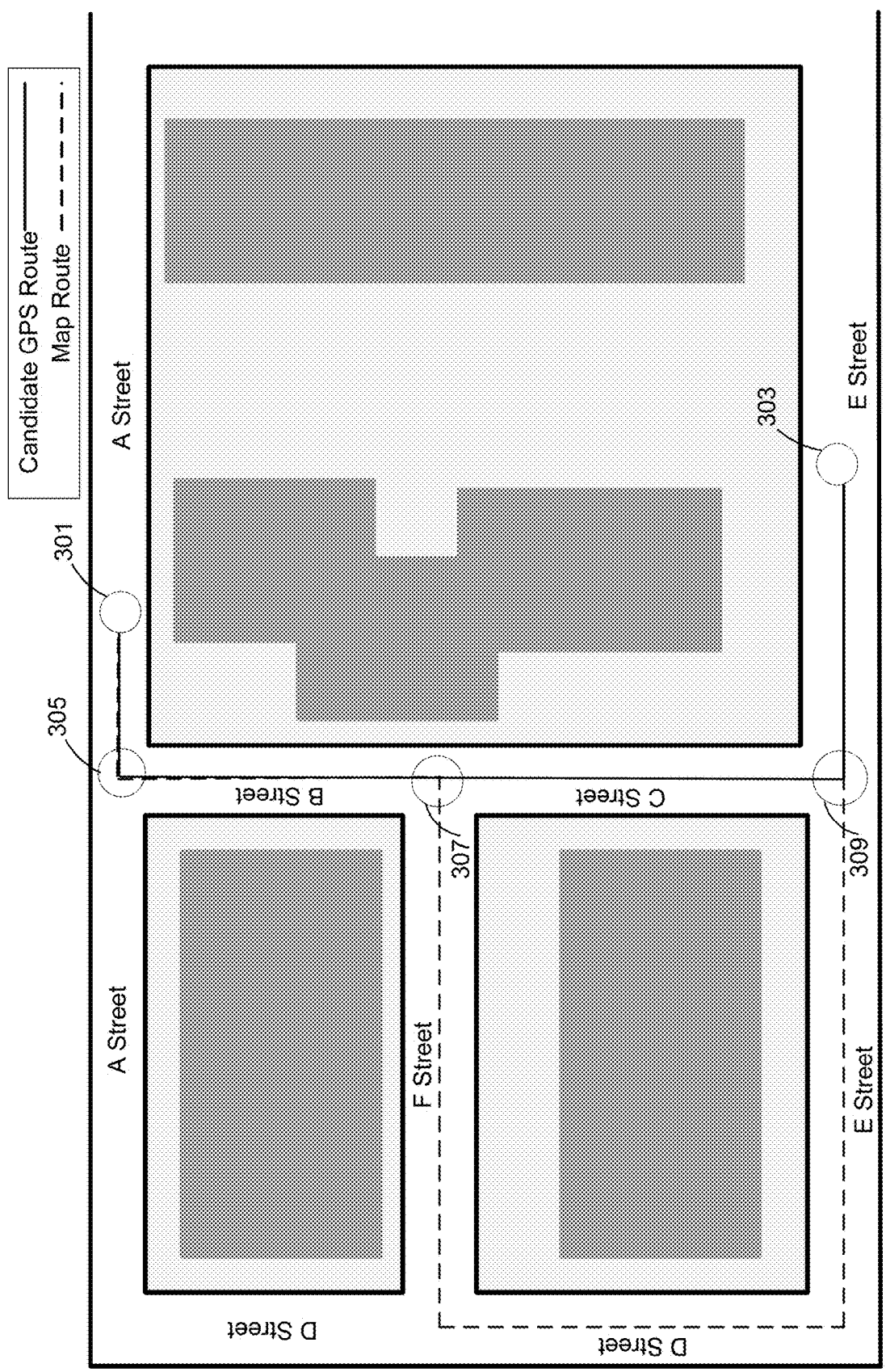

FIG. 3C illustrates the points of examination by the examination module 205 according to one embodiment. Note that FIG. 3C illustrates the map route matched to the road network from the map data for discussion purposes only. The map route is not mapped to the map data in implementation and is merely shown in FIG. 3C to highlight the differences between the candidate GPS route and map route with respect to the road network. The map route does not need to go through the map matching step in order to get the segments in the map data, because the map route itself comprises connected segments from map data already.

As shown in FIG. 3C, the candidate GPS route started on A Street and included the driver driving westbound on A street. The examination module 205 may compare the attributes of A Street from the map data with the attributes for A Street from the candidate GPS route. The examination module 205 may compare for example the directionality of A Street from the map data with the directionality of the candidate GPS route on A Street to determine whether there are any inconsistencies between attributes from the map data and attributes of the candidate GPS route. The directionality of A Street in the map data may indicate that A Street is a bi-directional street which is consistent with the directionality of the candidate GPS route on A Street, thus indicating that the map data for A Street is accurate.

In one embodiment, the examination module 205 also evaluates an intersection point between road segments from the candidate GPS route that intersect other road segments in the map data. In particular, the examination module 205 evaluates a turn restriction associated with each intersection point to determine whether a turn at the intersection point is prohibited or allowed. For example, the examination module 205 evaluates intersection point 305, which represents the intersection between A Street and B Street in the candidate GPS route. As shown in FIG. 3C, a left turn was made from A street onto B Street. The examination module 205 analyzes the turn restriction associated with the intersection of A Street and B Street from the map data to determine whether a left turn from A Street to B Street is allowed or prohibited. In this example, the map data indicates that there are no turn restrictions at intersection point 305, thereby indicating that the map data is accurate since a left turn was made onto B Street from A Street in the candidate GPS route.

Next, the examination module 205 evaluates the attributes of B Street with respect to the attributes of B Street from the candidate GPS route to determine any inconsistencies between the attributes. In this example, the examination module 205 does not identify any inconsistencies between the attributes in the map data for B Street and the attributes in the candidate GPS route for B Street thereby indicating that the map data for B Street is accurate.

The examination module 205 then examines the intersection point 307 between B Street and F Street. As shown in FIG. 3C, the candidate GPS route deviates from the map route at intersection point 307. The candidate GPS route indicates that the driver continued driving south on B street which turns into C street whereas the map route indicates to make a right turn from B Street onto F Street. Thus, there is a likelihood of a defect in the map data associated with the intersection point 307 that caused the deviation between the candidate GPS route and the map route. Note that the examination module 205 does not compare the GPS route and the map route and the discussion regarding the differences between the candidate GPS route and map route at intersection point 307 is merely for discussion purposes.

In this example, the map data's turn restriction for intersection point 307 indicates that a right turn is required from B Street onto F Street. Thus, the map data associated with the intersection point 307 does not allow for continuation onto C Street from B Street due to the turn restriction. In contrast, the candidate GPS route indicates that the driver did not turn right onto F Street from B Street as required by the map data, but instead continued onto C Street. Thus, the examination module 205 determines that the map data associated with the turn restriction for intersection point 307 is defective. In one embodiment, the examination module 205 generates and stores a list of identified defects in the map data for correction that includes the defective turn restriction for intersection point 307.

Next, the examination module 205 examines the attributes of C Street from the map data in comparison with the attributes of C Street from the candidate GPS route to identify any inconsistencies. In this example, the examination module 205 may determine that the directionality of C Street in the map data indicates that C Street is a unidirectional street in the north bound direction whereas the directionality of C Street from the candidate GPS route indicates that at the very least the directionality of C Street is unidirectional in the south bound direction. The identified inconsistency is the reason why intersection point 307 is associated with a turn restriction in the map data that required a right turn onto F Street as the map data for C Street indicates only north bound traffic is allowed on C Street. The examination module 205 adds the identified defect regarding the directionality of C Street to the list of identified defects.

Next, the examination module 205 examines the intersection point 309 between C Street and E Street. As shown in FIG. 3C, the candidate GPS route indicates a left turn onto E street. The examination module 205 may examine the turn restriction of intersection point 309 from the map data to determine whether a left turn onto E Street is prohibited or allowed. In this example, the examination indicates that the left turn onto E street is allowed thereby indicating that the map data is accurate given that the candidate GPS route indicates that a left turn was made onto E Street.

Lastly, the examination module 205 examines the attributes of E Street with respect to the attributes of E street from the candidate GPS route to determine any inconsistencies between the road network attributes. In this example, the examination module 205 does not identify any inconsistencies indicating that the map data for E Street is accurate.

Once the examination module 205 has completed the examination of all the ordered road segments and intersection points of the candidate GPS route, the examination module 205 provides the list of identified defects in the map data to the map update module 207 shown in FIG. 2. In one embodiment, the map update module 207 automatically updates the map data in the map database 113 that is identified as defective in the list of identified defects. Specifically, the map update module 207 automatically revises the map data identified as defective in the list of identified defects. For example, the map update module 207 may remove the turn restriction for intersection point 307 that requires the right turn onto F Street from B Street as well as update the directionality of C Street to allow for at least south bound traffic.

In another embodiment, rather than automatically updating the map data in the map database 113, the map update module 207 provides a prompt to an operator (e.g., a system administrator) of the network system 100 requesting approval to correct each identified defect in the map data. The operator can thus confirm that the map data is defective before allowing the map update module 207 to update the map data.

Figure 4A:
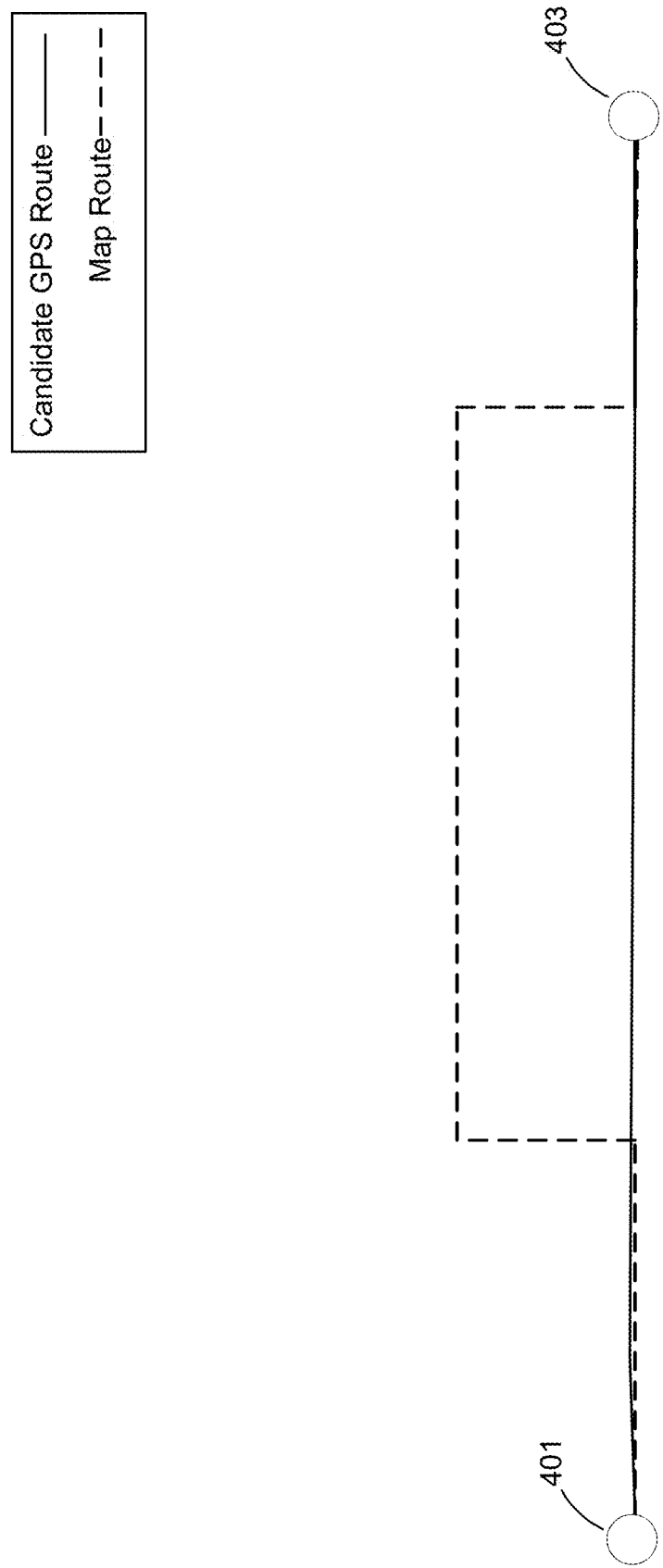
FIG. 4A illustrates a GPS route and a map route from a starting location to a destination location according to another embodiment.
Figure 4B:
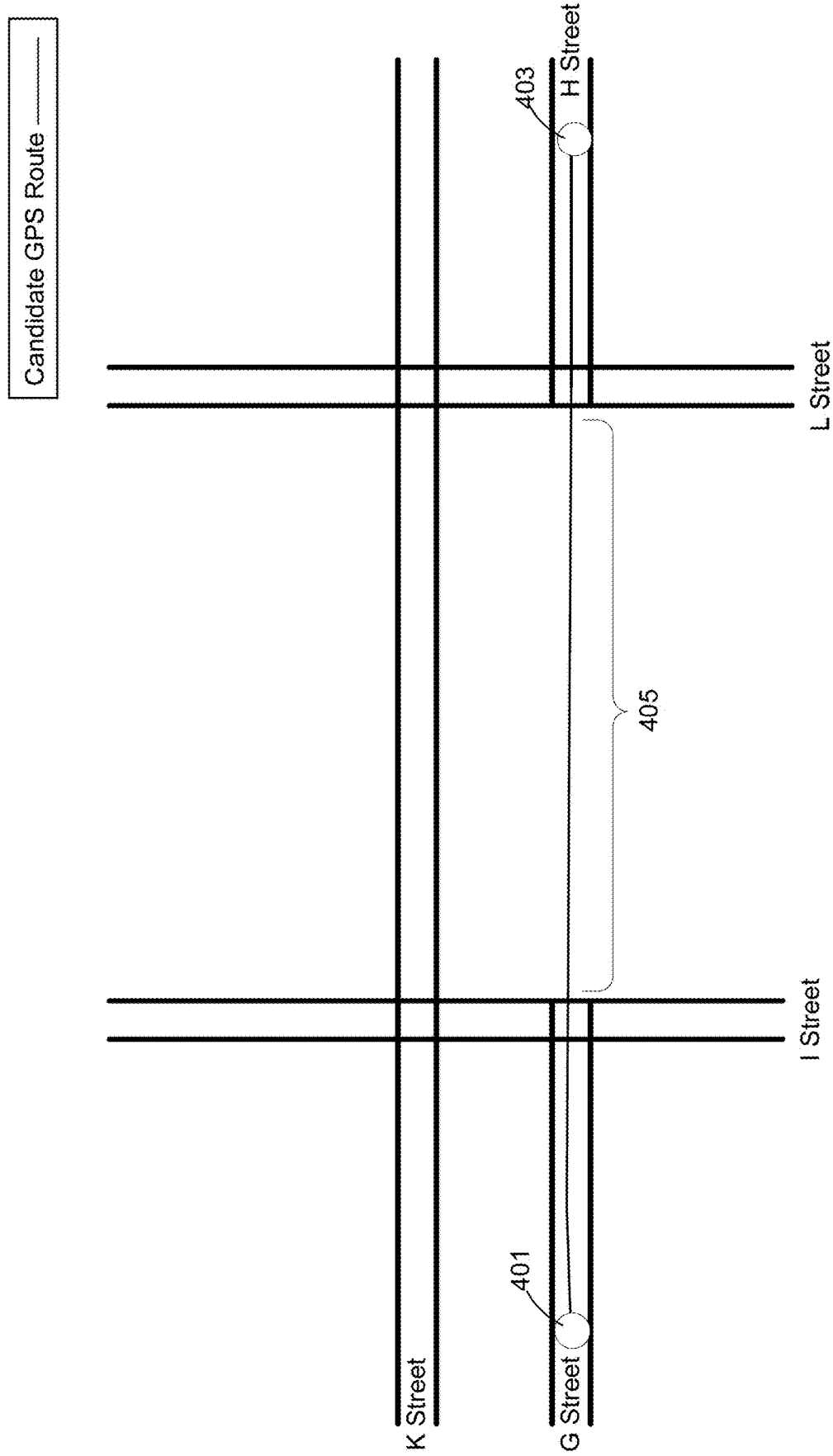
FIGS. 4B and 4C illustrates the GPS route of FIG. 4A matched to road segments of map data according to another embodiment.

In one embodiment, the evaluation module 119 may also identify missing road segments from the map data as described below with respect to FIGS. 4A to 4C. FIG. 4A illustrates a candidate GPS route and a map route from a starting location 401 to destination location 403. As described above, the candidate module 201 may determine whether the candidate GPS route or the map route is more efficient based at least on one of distance or time. In the example shown in FIG. 4A, the candidate module 201 determines that the candidate GPS route is more efficient than the map route due to the shorter distance and time required to travel from the starting location 401 to the destination location 403.

Next, the map match module 203 matches the candidate GPS route under evaluation to road segments in the map data stored in the map database 113 as described above. FIG. 4B illustrates the candidate GPS route shown in FIG. 4A that is matched to road segments in the map data. As shown in FIG. 4B, the candidate GPS route is matched to ordered road segments G street, an unidentified street 405 in the map data, and H street. Thus, to get from the starting location 401 to the destination location 403, the driver of the transportation vehicle drove east on G street onto the unidentified street 405 which turns into H street to reach the destination location 303.

The examination module 205 then evaluates each road segment included in the set of road segments according to the identified order of the road segments. In the example shown in FIG. 4B, the examination module 205 would first evaluate G Street, then the unidentified street 405, and lastly H Street. The evaluation of each road segment includes a comparison of the attributes associated with the road segment from the map data with the attributes associated with the road segment from the candidate GPS route as described above. If the examination module 205 identifies an inconsistency between attributes associated with the road segment from the map data with attributes associated with the corresponding road segment from the candidate GPS route, the examination module 205 determines that the attribute in the map data is defective. Otherwise, if the attributes from the map data are consistent with the attributes of the candidate GPS route, the examination module 205 determines that the map data is accurate.

Figure 4C:
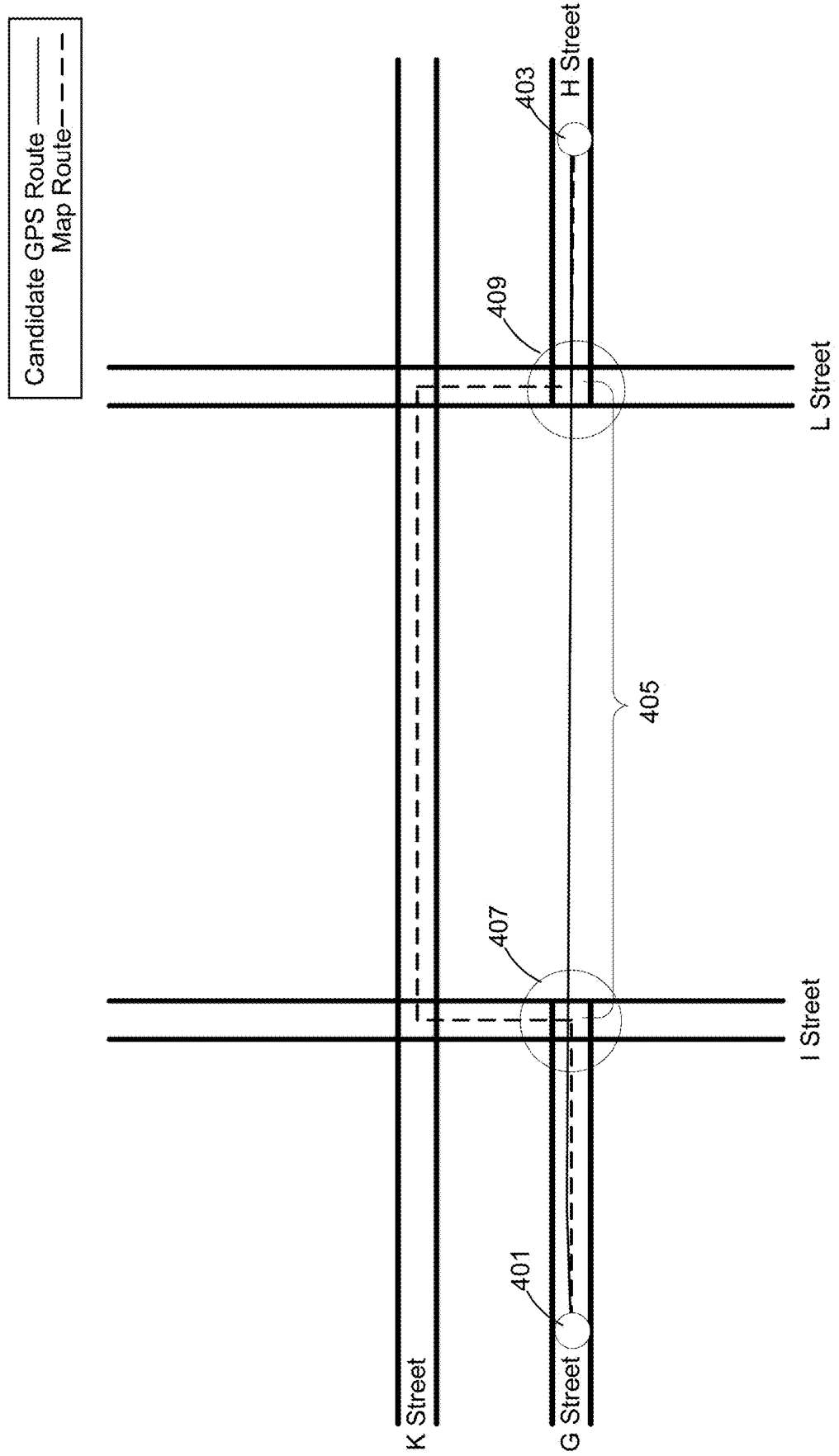

FIG. 4C illustrates the points of evaluation by the examination module 205 according to one embodiment. Note that FIG. 4C illustrates the map route matched to the road network from the map data for discussion purposes only. The map route is not mapped to the map data in implementation and is merely shown to highlight the differences between the candidate GPS route and map route in FIG. 4C. The map route does not need to go through the map matching step in order to get the segments in the map data, because the map route itself comprises connected segments from map data already.

As shown in FIG. 4C, the candidate GPS route started on G Street and included the driver driving east bound on G Street. The examination module 205 may compare the attributes of G Street from the map data with the attributes for the road segment from the candidate GPS route. The examination module 205 may compare for example the directionality of G Street from the map data with the directionality of the candidate GPS route on G Street to determine whether there are any inconsistencies between the map data and the candidate GPS route. The directionality of G Street in the map data may indicate that G Street is a bi-directional street which is consistent with the directionality of the candidate GPS route thus indicating that the map data for G Street is accurate.

The examination module 205 next evaluates the intersection point 407 between road segments G Street and I Street. As shown in FIG. 4C, the driver of the transportation vehicle continued driving onto the unidentified street 405 according to the candidate GPS route. However, the examination module 205's analysis of the turn restriction associated with the intersection of G Street and I Street from the map data indicates that a left turn is required onto I street from G street. Thus, the map data for intersection point 407 is inconsistent with the candidate GPS route. Accordingly, the examination module 205 determines that the turn restriction for intersection point 407 in the map data is defective and adds the turn restriction to the list of identified defects in the map data that requires correction.

As mentioned above, the unidentified street 405 is not described in the map data. The examination module 205 determines the attributes of the unidentified street 405 from the candidate GPS route such as the directionality of the unidentified street 405, speed, road network geometry, etc. In one embodiment, the list of identified defects is updated to include the determined attributes of the unidentified street 405.

Next, the examination module 205 examines the intersection point 409 between L Street and H Street. The examination module 205 may examine the turn restriction of intersection point 409 from the map data to determine whether a left turn onto H Street is required from L Street. However, as shown in FIG. 4C, L Street now also intersects with the unidentified street 405 and thus the turn restriction for intersection point 409 must be updated to account for the unidentified street 405.

Lastly, the examination module 205 examines the attributes of H Street with respect to the attributes of H Street from the candidate GPS route to determine any inconsistencies between the attributes. In this example, the examination module 205 does not identify any inconsistencies indicating that the map data for H Street is accurate.

Figure 4D:
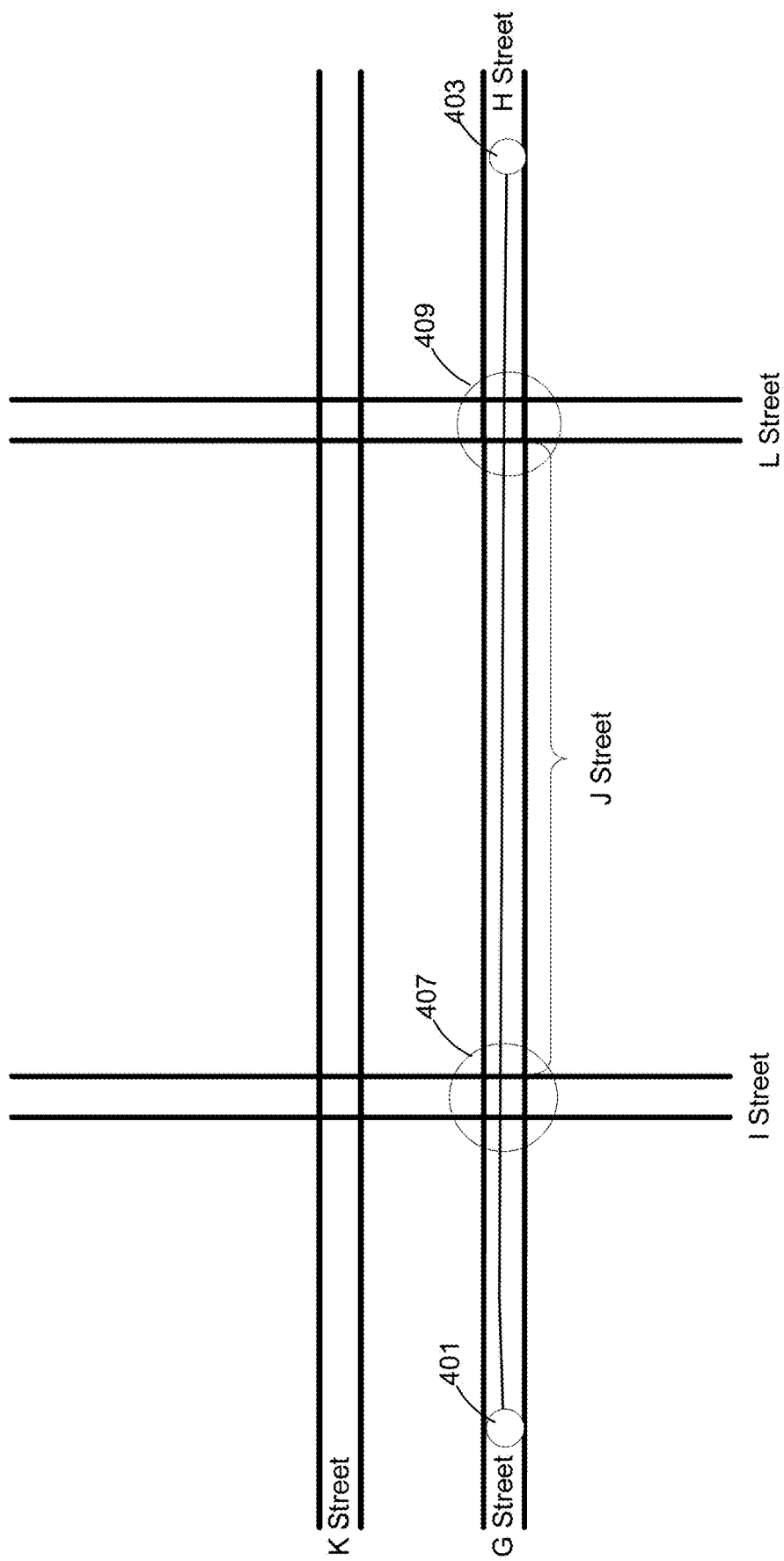
FIG. 4D illustrates an updated road segment of the map data according to one embodiment.

As described above, the examination module 205 provides the list of identified defects in the map data to the map update module 207. In one embodiment, the map update module 207 automatically updates the map data in the map database 113. Specifically, the map update module 207 revises the map data identified as defective in the list of identified defects. For example, the map update module 207 may update the road network geometry to include the unidentified street 405 in the road network geometry as shown in FIG. 4D. In FIG. 4D, the unidentified road is now J Street. The map update module 207 also updates the attributes of J Street based on the attributes for J Street from the candidate GPS route. For example, the speed limit for J Street may be determined based on the attributes from the candidate GPS route (e.g., the geometry of J Street and the time the driver took to drive J Street) as well as the speed limit of surrounding road segments. Furthermore, the turn restrictions for intersection points 407 and 409 are updated in the map data to correct the identified defects. As mentioned above, rather than automatically updating the map data in the map database 113, in one embodiment the map update module 207 provides a prompt to an operator (e.g., a system administrator) of the network system 100 requesting approval to correct each identified defect in the map data. The operator can confirm that the map data is defective before allowing the map data to be updated.

Thus, the evaluation module 119 described above allows for the detection of defects in the ground truth map data and the refreshing of the ground truth map data based on GPS routes taken by service providers. This allows the network system 100 to maintain an accurate map data model while minimizing the amount of human labor. Also, the computer processing required to maintain the map data model is reduced since the evaluation module 119 is not required to evaluate the map route in detail. The evaluation module 119 is only required to evaluate the candidate GPS route in detail to identify map data defects.

Figure 5:
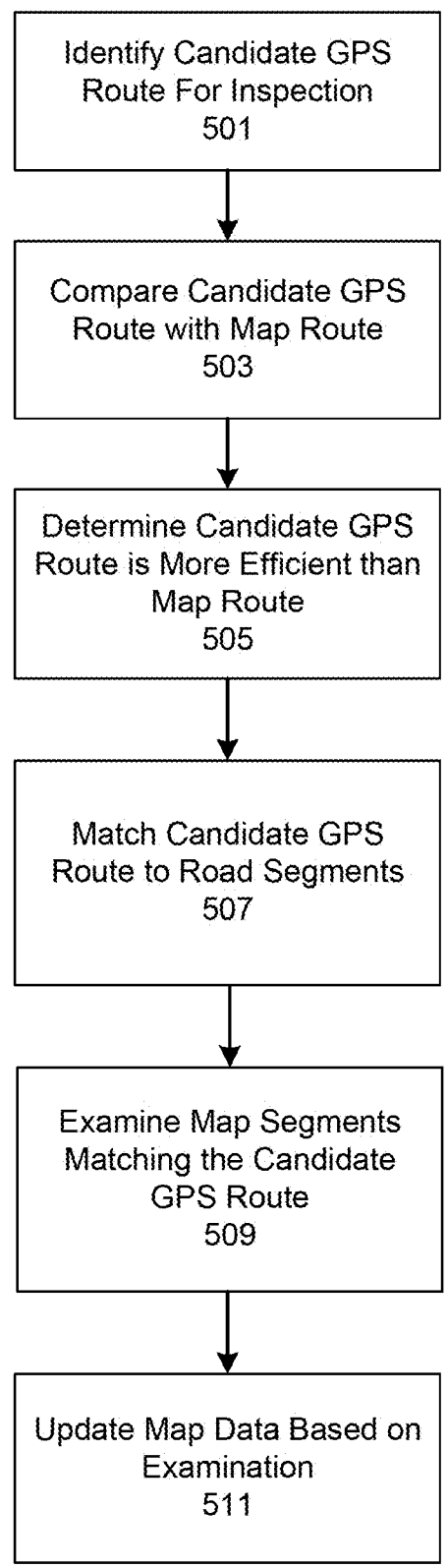
FIG. 5 is a method flow for determining defects of map data, according to one embodiment.

FIG. 5 illustrates one embodiment of a method flow diagram for detecting defects in map data. Note that in other embodiments, steps other than those shown in FIG. 5 may be performed to determine the trip for the transportation vehicle.

In one embodiment, the network system 100 identifies 501 a candidate GPS route from a starting location to a destination location for examination. The candidate GPS route may be examined immediately after the candidate GPS route is completed or at a later time. The network system 100 compares 503 the candidate GPS route with a map route. The map route is a route determined by the network system 100 from the starting location to the destination location using ground truth map data of the network system 100.

The network system 100 determines 505 that the candidate GPS route is more efficient than the map route based on the comparison. The network system 100 determines the candidate GPS route is more efficient based on various factors such as the distance between the starting location to the destination location and/or the time required to travel from the starting location to the destination location.

The network system 100 matches 507 the candidate GPS route to road segments from the map data. Each of the road segments are examined 509 by the network system 100 to determine attributes of the road segments that are inconsistent with the attributes of the road segments from the candidate GPS route. Any inconsistencies identified by the network system 100 is considered a defect in the map data. The network system 100 updates 511 the map data based on the examination to correct any identified defects. The map data may be updated automatically or may require human permission before the network system 100 updates the map data.

Hardware Components

Figure 6:
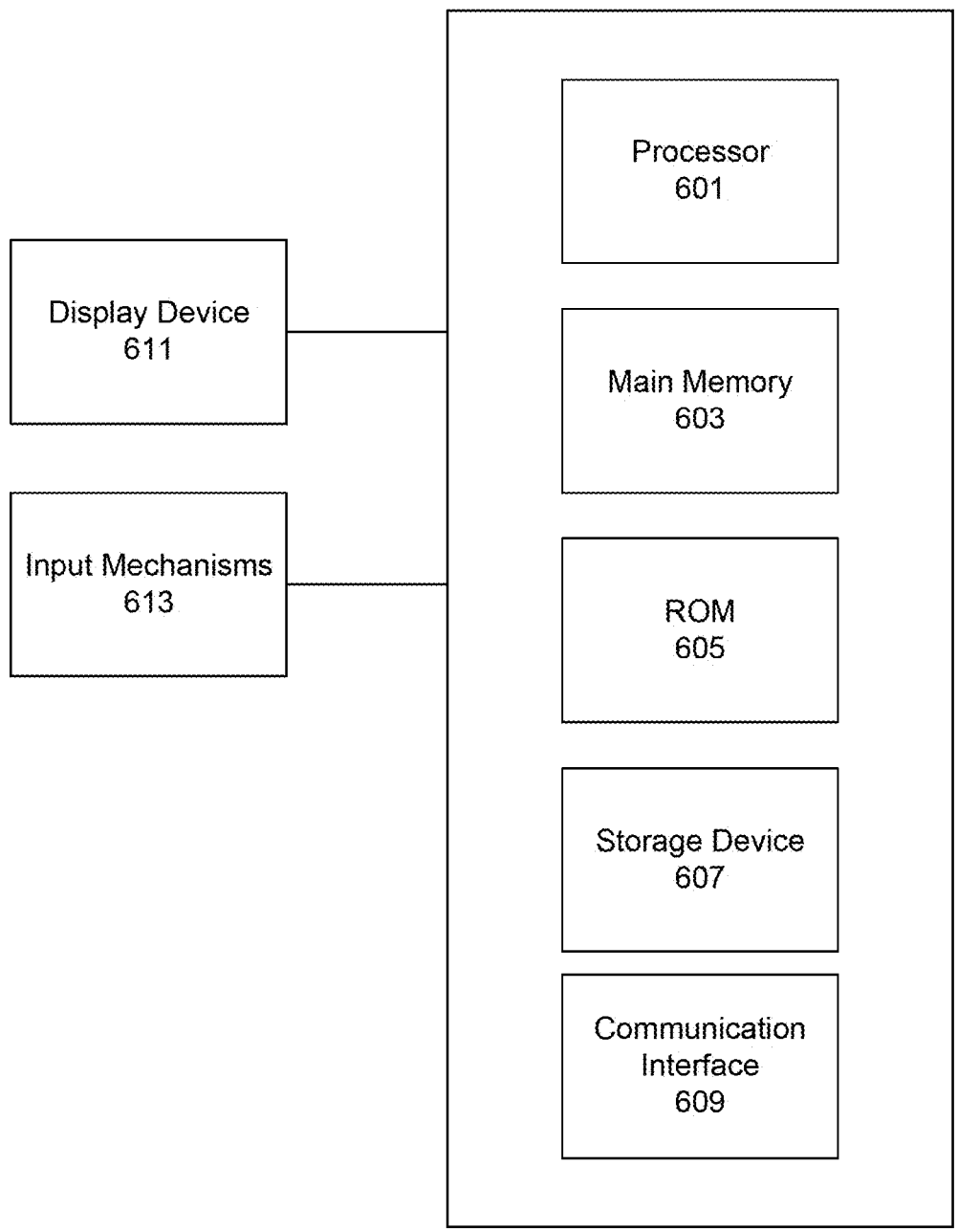
FIG. 6 illustrates a computer system that implements the embodiments herein according to one embodiment.

FIG. 6 is a diagram illustrating a computer system upon which embodiments described herein may be implemented. For example, in the context of FIG. 1, the network system 100 may be implemented using a computer system such as described by FIG. 6. The network system 100 may also be implemented using a combination of multiple computer systems as described by FIG. 6.

In one implementation, the network system 100 includes processing resources 601, main memory 603, read only memory (ROM) 605, storage device 607, and a communication interface 609. The network system 100 includes at least one processor 601 for processing information and a main memory 603, such as a random access memory (RAM) or other dynamic storage device, for storing information and instructions to be executed by the processor 601. Main memory 603 also may be used for storing temporary variables or other intermediate information during execution of instructions to be executed by processor 601. Network system 100 may also include ROM 605 or other static storage device for storing static information and instructions for processor 601. The storage device 607, such as a magnetic disk or optical disk, is provided for storing information and instructions.

The communication interface 609 can enable the network system 100 to communicate with one or more networks (e.g., cellular network) through use of the network link (wireless or wireline). Using the network link, the network system 100 can communicate with one or more computing devices, and one or more servers. In some variations, the network system 100 can be configured to receive sensor data (e.g., such as GPS data) from one or more location tracking devices via the network link. The sensor data can be processed by the processor 601 and can be stored in, for example, the storage device 607. The processor 601 can process the sensor data of a location tracking device in order to determine the path of travel of a transportation vehicle corresponding to the location tracking device. Extrapolated position information can be transmitted to one or more service requester devices over the network 105 to enable the service applications 109 running on the service requester devices to use the position information to present a visualization of the actual movement of the transportation vehicles.

The network system 100 can also include a display device 611, such as a cathode ray tube (CRT), an LCD monitor, LED monitor, or a television set, for example, for displaying graphics and information to a user. An input mechanism 613, such as a keyboard that includes alphanumeric keys and other keys, can be coupled to the network system 100 for communicating information and command selections to processor 601. Other non-limiting, illustrative examples of input mechanisms 613 include a mouse, a trackball, touch-sensitive screen, or cursor direction keys for communicating direction information and command selections to processor 601 and for controlling cursor movement on display device 611.

Examples described herein are related to the use of the network system 100 for implementing the techniques described herein. According to one embodiment, those techniques are performed by the network system 100 in response to processor 601 executing one or more sequences of one or more instructions contained in main memory 603. Such instructions may be read into main memory 603 from another machine-readable medium, such as storage device 607. Execution of the sequences of instructions contained in main memory 603 causes processor 601 to perform the process steps described herein. In alternative implementations, hard-wired circuitry may be used in place of or in combination with software instructions to implement examples described herein. Thus, the examples described are not limited to any specific combination of hardware circuitry and software.

Figure 7:
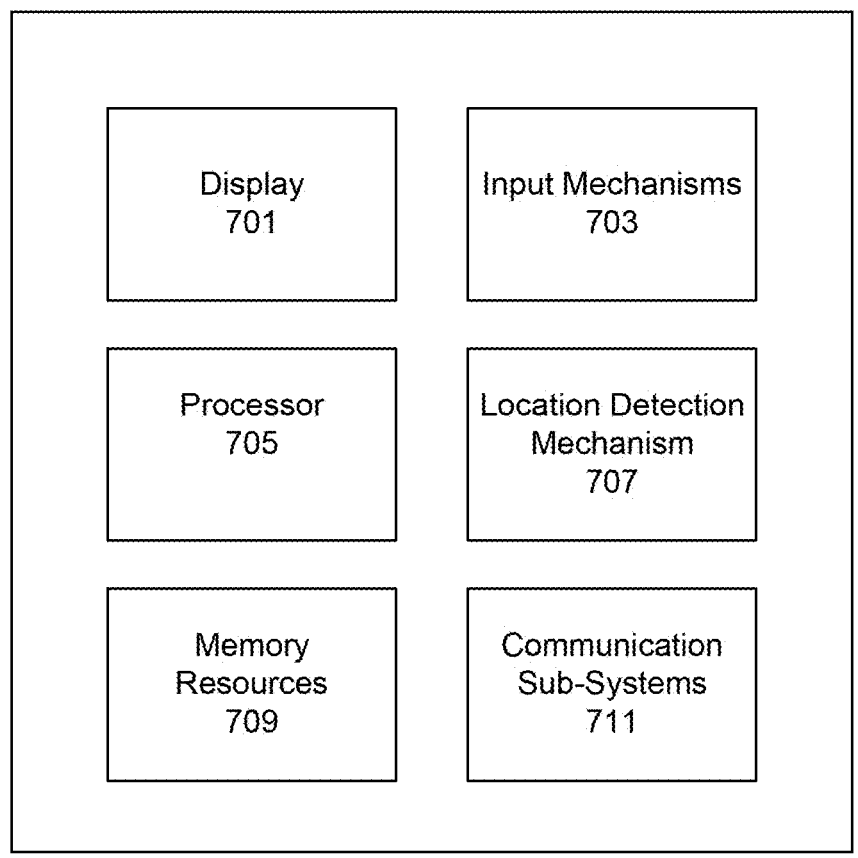
FIG. 7 illustrates a mobile computing device that implements the embodiments herein according to one embodiment.

FIG. 7 is a diagram illustrating a mobile computing device upon which embodiments described herein may be implemented. In one embodiment, a computing device 700 may correspond to a mobile computing device, such as a cellular device that is capable of telephony, messaging, and data services. The computing device 700 can correspond to each of the service provider device 101 and the service requester device 103. Examples of such devices include smartphones, handsets or tablet devices for cellular carriers. Computing device 700 includes a processor 705, memory resources 709, a display device 701 (e.g., such as a touch-sensitive display device), one or more communication sub-systems 711 (including wireless communication sub-systems), input mechanisms 703 (e.g., an input mechanism can include or be part of the touch-sensitive display device), and one or more location detection mechanisms (e.g., GPS module) 707. In one example, at least one of the communication sub-systems 711 sends and receives cellular data over data channels and voice channels.

The processor 705 is configured with software and/or other logic to perform one or more processes, steps and other functions described with implementations, such as those described herein. Processor 705 is configured, with instructions and data stored in the memory resources 709, to operate a service application as described herein. For example, instructions for operating the service application in order to display user interfaces can be stored in the memory resources 709 of the computing device 700.

From the viewpoint of a service provider, a service provider operating a service provider device 101 can operate the service application 111 so that sensor data, such as location/position data, can be determined from the location detection mechanism 707. This location/position data can then be wirelessly transmitted to the system via the communication sub-systems 711. From the viewpoint of an end-user, a user can operate the service application 109 in order to receive position information of one or more transportation vehicles from the system (via the communication sub-systems 911).

The processor 705 can provide content to the display 701 by executing instructions and/or applications that are stored in the memory resources 709. In some examples, one or more user interfaces can be provided by the processor 705, such as a user interface for the service application, based at least in part on the received position information of the one or more transportation vehicles. While FIG. 7 is illustrated for a mobile computing device, one or more embodiments may be implemented on other types of devices, including full-functional computers, such as laptops and desktops (e.g., PC).

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

We claim:

1. A computer-implemented method for detecting defects in map data, the method comprising:
   storing ground truth map data describing a road network in a map database;
   storing a plurality of global positioning system (GPS) routes;
   identifying a candidate GPS route from the plurality of GPS routes for examination, the candidate GPS route indicative of a route driven by a vehicle from a starting location to a destination location;
   determining a map route from the starting location to the destination location based on the stored ground truth data;
   determining that the candidate GPS route is more efficient than the map route based on at least one of distance and time;
   identifying defects in the ground truth map data based on the candidate GPS route being more efficient than the map route;
   updating the ground truth map data to fix the identified defects;
   receiving a request from a device for directions from a requested starting location to a requested destination location;
   determining a route from the requested starting location to the requested destination location based on the updated ground truth map data responsive to the request; and
   providing the requested directions including the determined route to the device.

2. The computer-implemented method of claim 1, wherein determining that the candidate GPS route is more efficient than the map route comprises:
   determining a distance from the starting location to the destination location and a travel time from the starting location to the destination location using the candidate GPS route;
   determining a distance from the starting location to the destination location and a travel time from the starting location to the destination location using the map route; and
   comparing the determined distance and travel time from the starting location to the destination location using the candidate GPS route with the determined distance and travel time from the starting location to the destination location using the map route; and
   determining that the candidate GPS route is more efficient that the map route based on the comparison.

3. The computer-implemented method of claim 1, further comprising:
   matching the candidate GPS route to a plurality of road segments in the road network as described by the ground truth map data responsive to determining that the candidate GPS route is more efficient than the map route.

4. The computer-implemented method of claim 3, wherein matching the candidate GPS route comprises:
   determining a plurality of GPS points from the candidate GPS route;
   determining a plurality of location points from the ground truth map data that corresponds to the plurality of GPS points described by the candidate GPS route, each of the plurality of location points corresponding to one of the plurality of GPS points;
   determining the plurality of road segments that correspond to the plurality of location points; and
   determining a path of travel that is indicative of an ordering of the plurality of road segments based on the plurality of location points.

5. The computer-implemented method of claim 4, wherein each of the plurality of road segments is associated with a plurality of attributes that describe the road segment in the ground truth map data, the plurality of attributes for each road segment including a geometry of the road segment, a directionality of the road segment, a turn restriction associated with the road segment, and a speed limit of the road segment.

6. The computer-implemented method of claim 5, wherein determining the path of travel comprises:
   ignoring the attributes of the plurality of road segments; and
   determining the path of travel such that a geometric shape of the path of travel is consistent with a geometric shape of the candidate GPS route based on the ignored attributes.

7. The computer-implemented method of claim 5, wherein identifying defects in the ground truth map data comprises:
  comparing the plurality of attributes associated with each of the plurality of road segments from the ground truth map data with a plurality of attributes of a portion of the candidate GPS route that corresponds to the road segment;
  determining at least one attribute of the map data for a road segment from the plurality of road segments that is inconsistent with a corresponding one of the plurality of attributes of the portion of the candidate GPS route that corresponds to the road segment; and
  establishing the at least one attribute of the road segment as a defect in the map data.

8. The computer-implemented method of claim 1, wherein updating the ground truth data comprises:
  automatically updating the ground truth map data to fix the identified defects responsive to identifying the defects.

9. The computer-implemented method of claim 1, wherein updating the ground truth data comprises:
  transmitting a notification of the identified defects to an operator of the map database; and
  updating the ground truth map data to fix the identified defects responsive to receiving approval from the operator.

10. A computer program product comprising a non-transitory computer readable storage medium storing executable code for detecting defects in map data, the code when executed by one or more computer processors causes the one or more computer processors to perform steps comprising:
  storing ground truth map data describing a road network in a map database;
  storing a plurality of global positioning system (GPS) routes;
  identifying a candidate GPS route from the plurality of GPS routes for examination, the candidate GPS route indicative of a route driven by a vehicle from a starting location to a destination location;
  determining a map route from the starting location to the destination location based on the stored ground truth data;
  determining that the candidate GPS route is more efficient than the map route based on at least one of distance and time;
  identifying defects in the ground truth map data based on the candidate GPS route being more efficient than the map route;
  updating the ground truth map data to fix the identified defects;
  receiving a request from a device for directions from a requested starting location to a requested destination location;
  determining a route from the requested starting location to the requested destination location based on the updated ground truth map data responsive to the request; and
  providing the requested directions including the determined route to the device.

11. The computer program product of claim 10, wherein determining that the candidate GPS route is more efficient than the map route comprises:
  determining a distance from the starting location to the destination location and a travel time from the starting location to the destination location using the candidate GPS route;
  determining a distance from the starting location to the destination location and a travel time from the starting location to the destination location using the map route; and
  comparing the determined distance and travel time from the starting location to the destination location using the candidate GPS route with the determined distance and travel time from the starting location to the destination location using the map route; and
  determining that the candidate GPS route is more efficient that the map route based on the comparison.

12. The computer program product of claim 10, wherein the code when executed by the one or more computer processors cause the one or more computer processors to perform further steps comprising:
  matching the candidate GPS route to a plurality of road segments in the road network as described by the ground truth map data responsive to determining that the candidate GPS route is more efficient than the map route.

13. The computer program product of claim 12, wherein matching the candidate GPS route comprises:
  determining a plurality of GPS points from the candidate GPS route;
  determining a plurality of location points from the ground truth map data that corresponds to the plurality of GPS points described by the candidate GPS route, each of the plurality of location points corresponding to one of the plurality of GPS points;
  determining the plurality of road segments that correspond to the plurality of location points; and
  determining a path of travel that is indicative of an ordering of the plurality of road segments based on the plurality of location points.

14. The computer program product of claim 13, wherein each of the plurality of road segments is associated with a plurality of attributes that describe the road segment in the ground truth map data, the plurality of attributes for each road segment including a geometry of the road segment, a directionality of the road segment, a turn restriction associated with the road segment, and a speed limit of the road segment.

15. The computer program product of claim 14, wherein determining the path of travel comprises:
  ignoring the attributes of the plurality of road segments; and
  determining the path of travel such that a geometric shape of the path of travel is consistent with a geometric shape of the candidate GPS route based on the ignored attributes.

16. The computer program product of claim 14, wherein identifying defects in the ground truth map data comprises:
  comparing the plurality of attributes associated with each of the plurality of road segments from the ground truth map data with a plurality of attributes of a portion of the candidate GPS route that corresponds to the road segment;
  determining at least one attribute of the map data for a road segment from the plurality of road segments that is inconsistent with a corresponding one of the plurality of attributes of the portion of the candidate GPS route that corresponds to the road segment; and
  establishing the at least one attribute of the road segment as a defect in the map data.

17. The computer program product of claim 10, wherein updating the ground truth data comprises:

automatically updating the ground truth map data to fix the identified defects responsive to identifying the defects.

18. A system for detecting defects in map data, the system comprising:
a non-transitory computer-readable storage medium storing executable code; and
one or more computer processors configured to execute the code which causes the one or more computer processors to perform steps comprising:
storing ground truth map data describing a road network in a map database;
storing a plurality of global positioning system (GPS) routes;
identifying a candidate GPS route from the plurality of GPS routes for examination, the candidate GPS route indicative of a route driven by a vehicle from a starting location to a destination location;
determining a map route from the starting location to the destination location based on the stored ground truth data;
determining that the candidate GPS route is more efficient than the map route based on at least one of distance and time;
identifying defects in the ground truth map data based on the candidate GPS route being more efficient than the map route;
updating the ground truth map data to fix the identified defects;
receiving a request from a device for directions from a requested starting location to a requested destination location;
determining a route from the requested starting location to the requested destination location based on the updated ground truth map data responsive to the request; and
providing the requested directions including the determined route to the device.

19. The system of claim 18, wherein determining that the candidate GPS route is more efficient than the map route comprises:
determining a distance from the starting location to the destination location and a travel time from the starting location to the destination location using the candidate GPS route;
determining a distance from the starting location to the destination location and a travel time from the starting location to the destination location using the map route; and
comparing the determined distance and travel time from the starting location to the destination location using the candidate GPS route with the determined distance and travel time from the starting location to the destination location using the map route; and
determining that the candidate GPS route is more efficient that the map route based on the comparison.

20. The system of claim 19, wherein the code when executed by the one or more computer processors cause the one or more computer processors to perform further steps comprising:
matching the candidate GPS route to a plurality of road segments in the road network as described by the ground truth map data responsive to determining that the candidate GPS route is more efficient than the map route,
wherein matching the candidate GPS route comprises:
determining a plurality of GPS points from the candidate GPS route;
determining a plurality of location points from the ground truth map data that corresponds to the plurality of GPS points described by the candidate GPS route, each of the plurality of location points corresponding to one of the plurality of GPS points;
determining the plurality of road segments that correspond to the plurality of location points; and
determining a path of travel that is indicative of an ordering of the plurality of road segments based on the plurality of location points;
wherein each of the plurality of road segments is associated with a plurality of attributes that describe the road segment in the ground truth map data, the plurality of attributes for each road segment including a geometry of the road segment, a directionality of the road segment, a turn restriction associated with the road segment, and a speed limit of the road segment;
wherein identifying defects in the ground truth map data comprises:
comparing the plurality of attributes associated with each of the plurality of road segments from the ground truth map data with a plurality of attributes of a portion of the candidate GPS route that corresponds to the road segment;
determining at least one attribute of the map data for a road segment from the plurality of road segments that is inconsistent with a corresponding one of the plurality of attributes of the portion of the candidate GPS route that corresponds to the road segment; and
establishing the at least one attribute of the road segment as a defect in the map data.

* * * * *